(12) United States Patent
Sarwari

(10) Patent No.: US 8,149,307 B2
(45) Date of Patent: Apr. 3, 2012

(54) METHODS OF FABRICATING INTEGRATED IMAGER AND MICROCONTROLLER

(75) Inventor: Atif Sarwari, Saratoga, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 12/611,349

(22) Filed: Nov. 3, 2009

(65) Prior Publication Data

US 2010/0047956 A1 Feb. 25, 2010

Related U.S. Application Data

(62) Division of application No. 11/410,100, filed on Apr. 25, 2006, now Pat. No. 7,630,008, which is a division of application No. 10/143,093, filed on May 13, 2002, now Pat. No. 7,106,367.

(51) Int. Cl.
  *H04N 3/14* (2006.01)
  *H01L 21/00* (2006.01)

(52) U.S. Cl. .......................... 348/294; 438/59

(58) Field of Classification Search .......... 348/294–324; 438/57, 59–63, 69–81, 98
See application file for complete search history.

(56) References Cited

U.S. PATENT DOCUMENTS

| | | | |
|---|---|---|---|
| 4,496,980 A | 1/1985 | Pfleiderer et al. | |
| 4,573,076 A | 2/1986 | Tisue et al. | |
| 5,604,531 A | 2/1997 | Iddan et al. | |
| 5,627,656 A | 5/1997 | Sonohara et al. | |
| 5,872,596 A | 2/1999 | Yanai et al. | |
| 6,002,835 A | 12/1999 | Watanabe | |
| 6,133,563 A * | 10/2000 | Clark et al. | ................ 250/208.1 |
| 6,175,383 B1 | 1/2001 | Yadid-Pecht et al. | |
| 6,240,312 B1 | 5/2001 | Alfano et al. | |
| 6,512,218 B1 * | 1/2003 | Canini et al. | ................ 250/208.1 |
| 6,515,701 B2 | 2/2003 | Clark et al. | |
| 6,529,241 B1 | 3/2003 | Clark | |
| 6,580,454 B1 | 6/2003 | Perner et al. | |
| 6,657,177 B2 | 12/2003 | Goto | |
| 6,847,398 B1 | 1/2005 | Fossum | |
| 6,856,349 B1 | 2/2005 | Trevino | |
| 7,068,315 B1 | 6/2006 | Suzuki et al. | |
| 7,129,978 B1 * | 10/2006 | Brehmer et al. | ............... 348/308 |
| 2001/0002045 A1 | 5/2001 | Fossum et al. | |
| 2001/0035902 A1 * | 11/2001 | Iddan et al. | ..................... 348/76 |

OTHER PUBLICATIONS

Plummer et al., Silicon VLSI Technology: Fundamentals, Practice and Modeling, Chapter 2, Pretice Hall 2000.*
"Compact Vision Chips Come into Focus," MDA Update Newsletter—Article #2008, 1997.
Oliver Graydon, "Selected Pixels Deliver Pictures by the Million," VLSI Vision Limited, pp. 1-2.
Eric J. Lerner, "Smoothing Turbulence Electromagnetically," American Institute of Physics, pp. 8-11, Oct. 2000.

(Continued)

*Primary Examiner* — David Ometz
*Assistant Examiner* — Dillon Durnford Geszvain
(74) *Attorney, Agent, or Firm* — Dickstein Shapiro LLP

(57) ABSTRACT

A method and apparatus providing a CMOS imager with an integrated controller on a common integrated circuit substrate. Also integrated on the common substrate are, a serializer circuit including a dynamic arbiter under the control of the microcontroller core and a set of extended special function registers through which data is passed to allow the microcontroller to control the CMOS imager and the serializer circuit.

18 Claims, 5 Drawing Sheets

OTHER PUBLICATIONS

J.E.D. Hurwitz, et al., "An 800K-Pixel Colour CMOS Sensor for Consumer Still Cameras," VLSI Vision Limited, Presented as part of Electronic Imaging at SPIE Photonics West, Feb. 10-11, 1997, pp. 1-11.

Peter B. Denyer, "CMOS vs. CCD," Vision & Imaging Business Unit, Jun. 1999.

S. Smith et al., "A Single-Chip 306 × 244 Pixel CMOS NTSC Video Camera," VLSI Vision Limited, Presented at Session 11 on Image Sensors at the IEEE International Solid-State Circuits Conference (ISSCC98), pp. 1-7, Feb. 1998.

* cited by examiner

| FIG. 1A | FIG. 1B |

| FIG. 1A | FIG. 1B |

METHODS OF FABRICATING INTEGRATED IMAGER AND MICROCONTROLLER

This application is a divisional of application Ser. No. 11/410,100, filed on Apr. 25, 2006, now U.S. Pat. No. 7,630,008, which is a divisional of application Ser. No. 10/143,093, filed on May 13, 2002, now U.S. Pat. No. 7,106,367, which are hereby incorporated by reference in their entireties.

FIELD OF THE INVENTION

The present invention relates generally to improved semiconductor imaging devices and in particular to a programmable CMOS imaging device.

BACKGROUND OF THE INVENTION

The ability to provide relatively inexpensive miniature digital cameras based on semiconductor imaging devices has opened up a wide range of new imaging applications.

There are a number of different types of semiconductor-based imagers, including charge coupled devices (CCDs), photodiode arrays, charge injection devices and hybrid focal plane arrays. CCD technology is often employed for image acquisition and enjoys a number of advantages which makes it the incumbent technology, particularly for compact imaging applications. CCDs are capable of large formats with small pixel size and they employ low noise charge domain processing techniques.

However, CCD imagers also suffer from a number of disadvantages. For example, they are susceptible to radiation damage, they exhibit destructive read-out over time, they require good light shielding to avoid image smear and they have a high power dissipation for large arrays. Additionally, while offering high performance, CCD arrays are difficult to integrate with CMOS processing in part due to a different processing technology and to their high capacitances, complicating the integration of on-chip drive and signal processing electronics with the CCD array. While there have been some attempts to integrate on-chip signal processing with CCD arrays, these attempts have not been entirely successful. CCDs also must transfer an image by line charge transfers from pixel to pixel, requiring that the entire array be read out into a memory before individual pixels or groups of pixels can be accessed and processed. This takes time. CCDs may also suffer from incomplete charge transfer from pixel to pixel which results in image smear.

Because of the inherent limitations in CCD technology, there is an interest in CMOS imagers for possible use as low cost imaging devices and for use in ultra-compact imaging applications.

A CMOS imager circuit includes a focal plane array of pixel cells, each one of the cells including either a photogate, photoconductor or a photodiode overlying a substrate for accumulating photo-generated charge in the underlying portion of the substrate. A readout circuit is connected to each pixel cell and includes at least an output field effect transistor formed in the substrate and a charge transfer section formed on the substrate adjacent the photogate, photoconductor or photodiode having a sensing node, typically a floating diffusion node, connected to the gate of an output transistor. The imager may include at least one electronic device such as a transistor for transferring charge from the underlying portion of the substrate to the floating diffusion node and one device, also typically a transistor, for resetting the node to a predetermined charge level prior to charge transference.

In a CMOS imager, the active elements of a pixel cell perform the necessary functions of: (1) photon to charge conversion; (2) accumulation of image charge; (3) transfer of charge to the floating diffusion node accompanied by charge amplification; (4) resetting the floating diffusion node to a known state before the transfer of charge to it; (5) selection of a pixel for readout; and (6) output and amplification of a signal representing pixel charge. Photo charge may be amplified when it moves from the initial charge accumulation region to the floating diffusion node. The charge at the floating diffusion node is typically converted to a pixel output voltage by a source follower output transistor. The photosensitive element of a CMOS imager pixel is typically either a depleted p-n junction photodiode or a field induced depletion region beneath a photogate or photoconductor. For photodiodes, image lag can be eliminated by completely depleting the photodiode upon readout.

CMOS imagers of the type discussed above are generally known as discussed, for example, in Nixon et al., "256×256 CMOS Active Pixel Sensor Camera-on-a-Chip," IEEE Journal of Solid-State Circuits, Vol. 31(12), pp. 2046-2050 (1996); Mendis et al., "CMOS Active Pixel Image Sensors," IEEE Transactions on Electron Devices, Vol. 41(3), pp. 452-453 (1994), as well as U.S. Pat. No. 5,708,263 and U.S. Pat. No. 5,471,515, which are incorporated herein by reference.

The advantages of CMOS imagers over CCD imagers are that CMOS imagers have a low voltage operation and low power consumption; CMOS imagers are compatible with integrated on-chip electronics (control logic and timing, image processing, and signal conditioning such as A/D conversion); CMOS imagers allow random access to the image data; and CMOS imagers have lower fabrication costs as compared with the conventional CCD because standard CMOS processing techniques can be used. Additionally, low power consumption is achieved for CMOS imagers because only one row of pixels at a time needs to be active during the readout and there is no charge transfer (and associated switching) from pixel to pixel during image acquisition. On-chip integration of electronics is particularly advantageous because of the potential to perform many signal conditioning functions in the digital domain (versus analog signal processing) as well as to achieve a reduction in system size and cost.

One application for a CMOS imager is in a swallowable capsule imager. Although swallowable (ingestible) capsule imagers have potential for providing significant diagnostic information, they do have limitations. Traversing the human gastrointestinal (GI) tract by peristaltic action typically takes about 10-24 hours. Accordingly, it would be advantageous to have an ingestible system in which the power supply would last long enough for the imager to pass through to the end of the colon, or which could be operated on novel low-power supply systems.

Also, the natural peristaltic transport is unidirectional and, in current systems, images are generally reviewed after passage of the pill, not in real time. Thus the quality of every captured image is important. Accordingly, it is desirable to have advanced image control including exposure control.

Further it is desirable to communicate environmental parameters and system parameters in the video stream thus avoiding additional transmission circuit complexity. Still further, it is desirable to make a self-contained system that is readily reconfigurable as new applications become available. These advanced operations and the operational flexibility are difficult to achieve in the basic ingestible capsule imager.

The operation of the charge collection of the CMOS imager is known in the art and is described in several publications such as Mendis et al., "Progress in CMOS Active Pixel Image Sensors," SPIE Vol. 2172, pp. 19-29 (1994); Mendis et al., "CMOS Active Pixel Image Sensors for Highly Integrated Imaging Systems," IEEE Journal of Solid State Circuits, Vol. 32(2) (1997); and Eric R. Fossum, "CMOS Image Sensors: Electronic Camera on a Chip," IEDM Vol. 95, pp. 17-25 (1995) as well as other publications. These references are incorporated herein by reference. Additional disclosure related to the operation of one exemplary CMOS imager is found in U.S. Pat. No. 6,376,868 to Howard E. Rhodes issued Apr. 23, 2002 and in U.S. Pat. No. 6,333,205 to Howard E. Rhodes issued Dec. 25, 2001.

One of the problems in miniaturization of CMOS imagers while providing imager control flexibility is the number of discrete integrated circuits which must be used to form an operative imaging system. Three to eight separate chips are typically used for the imager sensor array, the controller, and other ancillary circuits which form the imager system. The use of separate discrete circuits is particularly problematic when one uses the imager in the environment of a swallowable pill where overall device size is of concern. In addition, having discrete circuits to perform different operations of the imaging system also consumes battery power, which is again in the environment of a swallowable pill.

SUMMARY OF THE INVENTION

In one aspect the present invention provides an image sensor device which comprises a common integrated circuit substrate having both a CMOS imager array and a microcontroller circuit integrated thereon. The microcontroller circuit is reprogrammable and controls certain aspects of the operation of the image sensor circuit, including exposure control and analog to digital conversion of image data. The microcontroller circuit may also be coupled to a dynamic arbiter circuit which is also integrated on the substrate to control aspects of the data formatting applied to an image data stream output by the image sensor circuit. The microcontroller can thus adjust such image data stream parameters as packet length, header length, and header content.

In another aspect, the present invention includes a CMOS image sensor that includes on a single chip a sensor array, a pixel data buffer coupled to the sensor array, a header data buffer, a dynamic arbiter coupled to the pixel data buffer and to the header data buffer, and an output register coupled to an output of the dynamic arbiter, where the dynamic arbiter is adapted to programmably switchingly couple the output register alternately to the pixel data buffer and to the header data buffer.

In a further aspect of the invention image data from one line of a CMOS image sensor is conveyed to an integrated processor. The integrated processor evaluates the image data and uses the results of the evaluation to control the subsequent exposure of another line of the CMOS image sensor. Depending on system requirements, data values returned from one line of the CMOS image sensor may be used to control image capture at an adjacent line of the image sensor.

These and other advantages and features of the invention will be more clearly understood from the following detailed description of the invention which is provided in connection with the accompanying drawings.

DETAILED DESCRIPTION OF THE INVENTION

Figures 1, 1A:
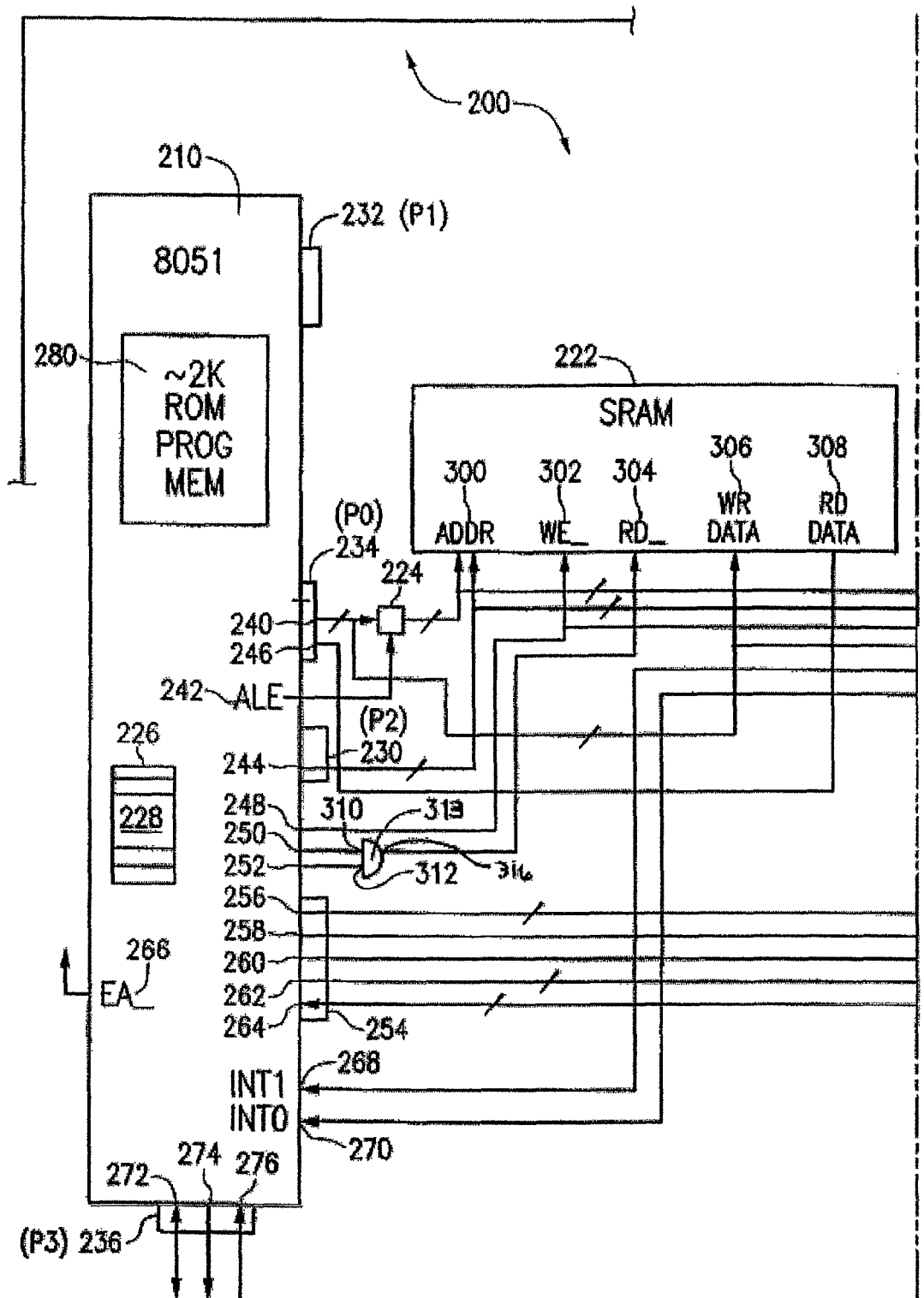
FIG. 1 an exemplary embodiment of the invention in block diagram form.
Figures 1, 1B:
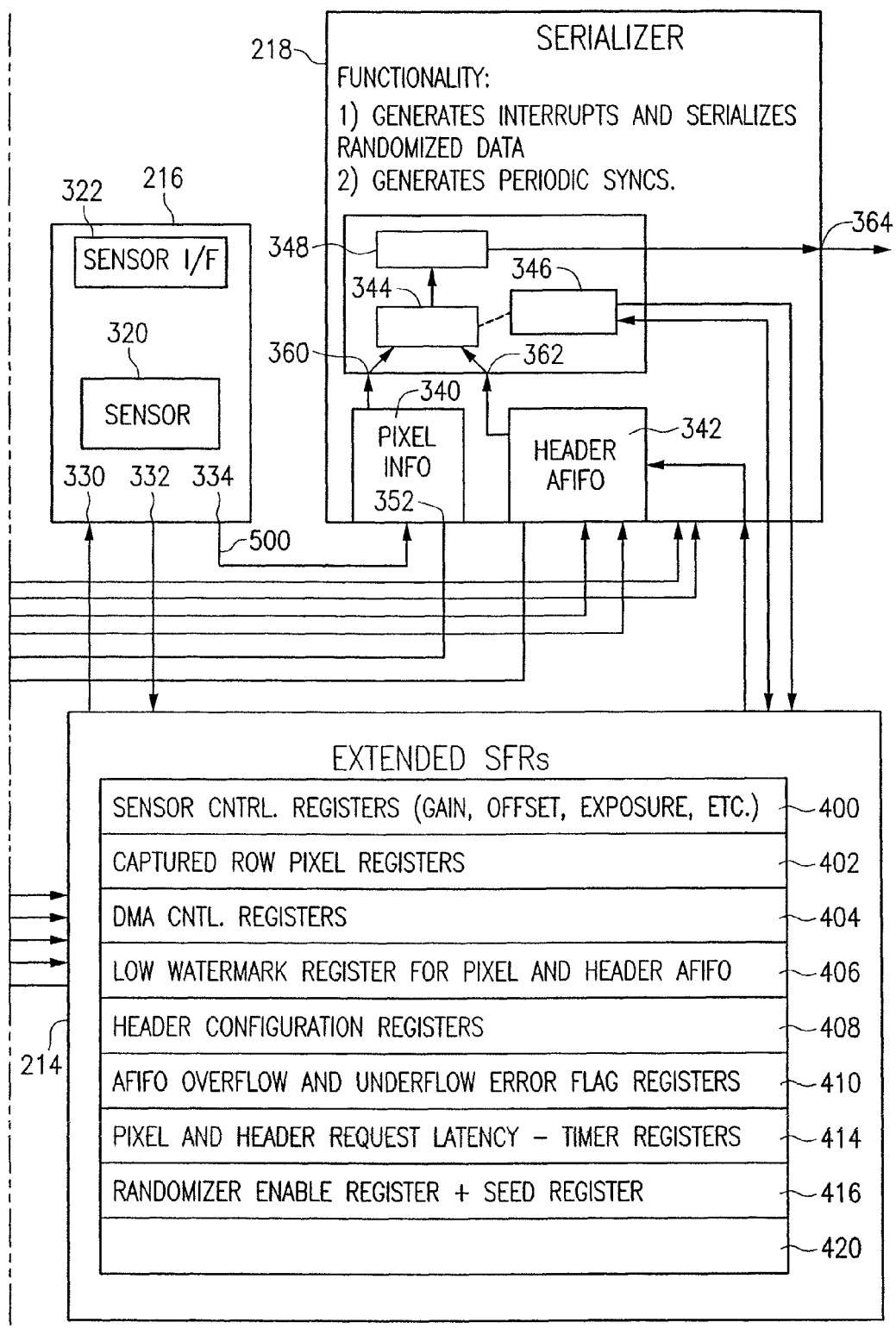

FIG. 1 shows an exemplary embodiment of the programmable image acquisition system of the invention in block diagram form.

The present invention adds versatility to an imager system while reducing power consumption by integrating a microcontroller 210 and an image sensor 216 on a common substrate 200. While any one of a number of known microcontrollers can be integrated on a common substrate with the image sensor 216, an exemplary embodiment of the desired programmability is achieved by integrating an 8051 microcontroller core (8051) on the same substrate as a CMOS image sensor array 216. In addition, a static random access memory (SRAM) 222 and associated address latch 224, a serializer module 218 adapted to frame and output data acquired by the array 216, and a set of extended special function registers (ESFR's) 214 adapted to facilitate communications between the microcontroller 210 and the and the other system components are also fabricated on the common substrate 200. Various conductive traces for coupling together the system hardware elements are also integrated on the common substrate 200.

In the illustrated exemplary embodiment of FIG. 1, a complete 8051 microcontroller 210 includes allocated and un-allocated special function registers 226. In the instant embodiment, certain of the un-allocated special function registers (SFR's) of the standard 8051 are not implemented or are disabled. The region 228 within the 8051 corresponding to these unimplemented SFR's is either left inactive, or used to implement alternate functionality.

The 8051 microcontroller includes 4 input/output (I/O) ports designated P0 234, P1 232, P2 230, and P3 236. According to the 8051 specification, when external memory is coupled to the 8051, as in the FIG. 1 embodiment, ports P0 234 and P2 230 are dedicated to communication with the external memory (external to the microcontroller 210). FIG. 1 illustrates SRAM 222 as external memory. Thus, the pinout of the 8051 includes the eight output lines of port 230 allocated to the low address bus output 240. The low address bus serves double duty as a low address bus and a write data bus. The 8051 also includes an Address Latch Enable (ALE) output 242. A high address output 244 of eight lines serves solely as a write data bus. The 8051 includes an active low write enable (WE_) line 248, an active low Read line (RD_) 250 and an active low Program read line (PSEN_) 252. In the present embodiment, a non-standard port is formed by bringing the control and data lines that, in a standard 8051, would be connected to the non-allocated SFR's, out of the 8051 core. These lines are collectively referred to as the Extended Special Function Register Port (ESFR Port) 254. The lines of the ESFR Port 254 include SFR address lines 256, active low ESFR read (ESFR RD_) 258 and ESFR write (ESFR WR_) 260 lines, an ESFR WRITE DATA bus 262 and an ESFR read data bus (264).

The 8051 further includes an EA_line 266, that when strapped high to de-assert the input causes the 8051 to use internal memory for the first 4 Kb of microcode and to use external memory beyond address 4K. As shown, the FIG. 1 embodiment straps EA_266 high to effect this mode of operation.

Interrupt 0 270 and interrupt 1 268 inputs provide hardware interrupt control over the 8051 core. Port P3 236 includes a bi-directional bus 272 for implementing a debugging interface generally similar to the proprietary IIC debugging interface (IIC is a registered trademark of Philips Corp.). This interface allows an external processor to take control of the 8051 during a debugging phase of development, as is known in the art. In practice, during debugging, the 8051 210 would receive a serial digital debugging signal at the debugging input 272 of the 8051. The image detector circuit 216 would be operated under control of the microcontroller 210. Likewise, the serializer circuit 218 would be operated under control of the microcontroller circuit as it receives an image data signal from the image detector circuit 216. The image data would be output at 364 and received and evaluated using external apparatus. The results of the evaluation would be used to prepare revised program software or operating parameters for the 8051 which could then be downloaded to the SRAM 222 of the 8051, or mask programmed into the internal ROM 280 of the microcontroller 210.

A further portion of the P3 236 port connections is devoted to a 4 bit wide bus 274 for controlling LED's that, when the invention is configured as an ingestible pill or capsule, or in other embodiments requiring subject illumination, provide illumination of a subject for image acquisition. The allocation of 4 bits is a matter of design choice, and in some embodiments, other configurations including a one bit wide data path could be used. Additional lines of the P3 236 port are devoted to hard wired inputs 276 that allow further configuration of the system during manufacturing by wiring of the inputs to a source of a particular potential such as supply potential (Vcc) or ground.

The 8051 core includes programmable Read Only Memory (ROM) 280 into which program code, such as microcode, and operating parameters may be programmed. The programmable ROM is mask programmable ROM and contains stored data that is defined by lithographic processing. A ROM 280 of approximately 2 Kb storage capacity is provided. Although the boot load program may be located externally during debugging, during normal operation at least part of the boot program is located in the programmable ROM 280. A boot program start location may be determined by the setting of hard configuration signals, such as those on line 276 at port P3 236.

FIG. 1 shows the system with RAM 222 external of the microcontroller to the and formed as static RAM (SRAM). In alternate embodiments, other memory technologies may be used such as Flash memory, SynchFlash memory, EEPROM, and DRAM. It is also readily conceivable that other memory technologies may also be used an integrated on common substrate 200. The RAM 222 includes connections for transferring data to the remainder of the system. These connections include 16 bit wide bidirectional address bus 300, an active low write enable (WE_) input 302, an active low read enable (RE_) input 304, an eight bit wide Write Data bus 306 and an eight bit wide Read Data bus 308.

The programmable sensor 200 of FIG. 1 includes a circuit allowing both program values and data values to be stored in a single memory circuit. This contrasts with a typical 8051 architecture, in which separate memory devices are provided for program memory and data memory. As shown in FIG. 1, the Read Data output 250 and Read Program output 252 of the 8051 core are coupled to respective first 310 and second 312 inputs of an AND gate 314. Both the Read Data output 250 and the Read Program output 252 are active low. The output 316 of the AND gate 313 thus exhibits an active low read signal whenever either the Read Data output or the Read Program output is active. The output 316 of the AND 313 gate is coupled to the active low Read input 304 of the memory circuit 222. Consequently both program reads and data reads may be made from the same memory array. As would be understood by one of skill in the art, segregation of program address space and data address space to avoid data interference can be maintained by software design.

FIG. 1 also shows a sensor circuit 216 including an array 320 of CMOS photodetectors, and sensor interface circuitry 322. The photodetectors are desirably implemented as active CMOS photodetectors, however passive CMOS photodetectors may also be employed according to the functional requirements to which a particular embodiment is directed. The photodetectors may be implemented as photodiode or photogate devices such as are known in the art, or as a combination thereof. Microscopic lenses or a macroscopic lens may be employed to improve light collection characteristics and thereby increase device efficiency. Appropriate filters may be applied across the array of devices, or microscopically device-by-device to create a color sensitive photosensor array. When device by device filtering is employed, filter elements may be distributed in a Bayer pattern, complementary pattern or in alternate patterns such as might be routinely chosen to suit the application. In like fashion the arrangement of individual photo sensor devices into a 2-dimensional rectangular array, a linear array, or into an alternative geometry would be a matter of design choice.

The interface circuitry of the FIG. 1 sensor circuit embodiment is shown to include a control input port 330 for receiving control input data, a control output port 332 for sending image data out to an extended SFR, from which the data may be transferred to the microcontroller 210, and a DMA RETURN output 334 for transferring image data out of the sensor circuit 216 and into the serializer module 218. While the data width of the various ports may be adapted to the requirements of various embodiments, in one embodiment, the control input port 330 and the control output port 332 are each 8 bits wide, and the DMA RETURN output 334 is 10 bits wide, including 8 data bits and 2 flow control bits. The DMA RETURN output 334, as shown includes a first line for conveying data and a second line for conveying a clock signal used to mark valid data states of the signal of the first line. The present invention includes the ability to program start and end columns for DMA of row pixel data. Thus, unlike prior art image sensors, which typically must transfer an entire array's worth of image data at one time, the present invention allows transfer of a chosen subset of a row's worth of image data, down to one pixel.

The serializer circuit 218 includes a pixel buffer 340, a header data buffer 342, a dynamic arbiter circuit, and an output shift register 348. The pixel data buffer 340 is implemented in the FIG. 1 embodiment as an Asynchronous First In First Out (AFIFO) buffer, as is the header data buffer 342. Depending on functional requirements, however, synchronous FIFO buffers, or alternative buffer architectures may be employed. The depth of the buffer employed may be chosen according to the requirements of the embodiment, and may range down to a single layer buffer. Likewise, the width of the buffer may be chosen in routine fashion. Typically the pixel buffer is wider than a single bit, and may range in width from one bit wide to the logical width of a row of the photo sensor array (e.g., 256 bytes). In the FIG. 1 embodiment, data is transferred serially one bit wide from the sensor DMA RETURNS output 334 to a pixel data input 350 of the serializer 218, and the pixel data buffer is wider than one bit. Thus the pixel data is collected in a shift register (not shown) at the input 350 of the serializer 218 and then shifted in parallel into the pixel data buffer 340.

In one aspect, the serializer also includes a randomizer circuit. In one aspect, the randomizer is implemented as a shift register with feedback in order to produce a pseudorandom output based on an input data stream—here the output of shift register 348. By randomizing the output data stream of the system, long periods of black or white, such as might otherwise degrade transmitter performance, are substantially avoided. The data from the randomizer is de-randomized at a receiver, based on a common randomizer seed value provided to both the randomizer circuit and to a de-randomizer circuit at the receiver. Depending on the ultimate use to which the of the image sensor of the invention is applied, this randomizing function may be used for encryption purposes thus maintaining security and integrity of data transferred to a receiving apparatus.

As shown, each buffer includes a limit indicator. In the transmission of video image data, it is important that the data stream be uninterrupted. The existence of gaps in data transmission due to slow processing time or other problems, is undesirable. Such undesirable gaps are referred to as "bubbles." The pixel data buffer includes an underflow indicator 352 adapted to trigger Interrupt 1 268 of the 8051 210 when the pixel data buffer 340 approaches an underflow state. The header data buffer 342 includes an overflow indicator adapted to trigger interrupt 0 270 of the 8051 210 when the header data buffer 342 approaches an overflow state. Inasmuch as bubble free data transmission is highly desirable for most imaging applications, the overflow indicator and underflow indicator are to be used primarily during debugging of the system. Once operative timing parameters have been established, the 8051 hardware interrupts should rarely, if ever, be triggered.

As mentioned above, data is received into the pixel data buffer 340 from the DMA RETURNS output 334 of the sensor module 216. Data is received into the header data buffer 342 from the 8051 210 by way of one or more of the ESFR's 214. Data is removed from both the pixel data buffer and the header data buffer by transfer of the data to respective first 360 and second 362 inputs of the dynamic arbiter 344.

The dynamic arbiter 344 includes a multiplexer that alternately routes data to an output 364 from the first input 360 during a first time period, and to the output 364 from the second input 362 during a second time period. By switching back and forth between the first and second outputs, the multiplexer introduces both header data and pixel data into an outgoing data stream in a controlled fashion.

The switching of the dynamic arbiter 344 is programmably defined under the control of the 8051 210. Thus the 8051 can output control data to one or more of the ESFR's such as, for example, a frame configuration register to define the switching patterns of the dynamic arbiter 344. The programming data conveyed through the ESFR's 214 from the 8051 210 is fed into a control circuit 346 within the serializer that executes arbiter switching according to the control data transmitted. While various embodiments are possible, a typical control circuit would be implemented as a finite state machine. It should be noted that while switching typically is count based, and depends on a quantity of header data or pixel data transmitted, time based control is also possible for particular applications.

Header data and pixel data passed through the dynamic arbiter multiplexer circuit is input to the shift register 348. The shift register 348 receives the header data and pixel data in parallel words, and typically shifts out the data in a one bit wide data stream. Depending on the programming control data supplied by the 8051, one or more consecutive words may be shifted into the shift register from either the pixel data buffer 340 or the header data buffer 342 before the dynamic arbiter multiplexer changes state and the previously non-selected buffer is selected. In this way, the composition and format of the output data stream is under the control of the microcontroller 210.

Particularly noteworthy is the fact that the substance of the header data is definable under 8051 processor software control. Accordingly, the header may be packed not only with parametric data related to previous or subsequent pixel data packets of a captured image, but also with ancillary data. Such ancillary data may include, for example, environmental data such as system temperature, externally measured temperature, externally measured pressure, and additional data such as time codes.

As noted, the format of data output in the data stream is under the control of the microcontroller 210. This is different from other integrated sensor processor sets in which processor does not control image acquisition and serialization, but receives serialized data, e.g. at 364 and processes the serialized data stream (e.g., by compressing that stream).

As shown in FIG. 1, the ESFR's include a sensor control register 400. The sensor control register is coupled between the 8051 210 and the sensor interface 320, and is adapted to transfer sensor control data to the sensor interface 320. Examples of sensor control data include gain parameters and offset parameters to be applied to the analog portion of the sensor interface, including amplifiers and analog to digital (A/D) converters. Other sensor control data includes exposure parameters adapted to control the exposure time between reset and read of a photosensor device. It should be noted that further exposure control opportunities exist inasmuch as the LED's which may be included for subject illumination are controllable in more than one way. The LED's are controllable through a discrete LED interface 274 implemented as part of Port 3 236 of the 8051. The LED's may also be controlled by control circuitry that is in turn adjusted based on data values passed from the 8051 through a register of the ESFR set 214.

The ESFR set 214 also includes a sensor capture register 402. The sensor capture register receives pixel data sensed by the rows of the photosensor array 320. The sensor capture register may receive all or part of the pixel data sensed by one row of the photosensor array. Typically, the data in the pixel capture register 402 includes data from the most recently read row of the array. Once this pixel data is stored in the sensor capture register, the stored pixel data is available to the 8051 210 for monitoring and control of photosensor performance. Such monitoring and control may be performed row by row, or may be performed down to the level of an individual pixel.

In one aspect of the invention, the 8051 microcontroller 210 may use data from one row of the CMOS image sensor array 320 to control one or more image capture parameters of the next adjacent row of the CMOS imager array. For example, after a first row of the image sensor is exposed, the data captured for that row is transferred from the image sensor through the sensor interface circuitry 322 to the sensor capture ESFR 402. The 8051 210 then reads the data from the ESFR 402 and evaluates the data by comparing the digital values that the data includes to pre-established setpoint values. Based on this evaluation, if necessary, the 8051 210 calculates revised values for one or more control parameters. These control parameters may include, e.g. exposure time, converter gain, converter offset, etc. The revised control parameters are output by the 8051 to one or more sensor control registers 400, and from there, the values are received by the sensor interface 322. These received values then affect subsequent operation of the sensor, possibly including sensing by the next adjacent row of the sensor array. Alternately, the revised control values may be transferred to the header data buffer 342 for transmission in a header data portion of the output data stream output at the data output 364. Thereafter, the revised control values may be retrieved by a post-processing system for post-processing of the output image data. It should be noted that other control methods and techniques such as adaptive control, feed-forward control, mathematical filtering, fuzzy logic techniques, etc. may be routinely applied by to the image data by appropriate programming of the 8051.

The 8051 may also be configured to extract substantive content form the pixel data stored in the image capture register. The substantive content may include environmental conditions reflected in the captured image data, or may include image content data encoded in the captured image. In one embodiment of the invention, the photosensor system is configured to allocate a fixed time (e.g. 20 seconds) during initialization of the system for the acquisition and storage of new operating parameters or operating algorithms by way of acquired image data.

As noted above, the data stored in the sensor capture register duplicates all or a portion of data that is transferred to the pixel data buffer through the DMA RETURNS output 334. The sensor interface thus has two parallel outgoing data paths for image data: a first path through a DMA RETURNS bus 500 and a second path through the sensor capture register 402. Operation of the DMA returns output 334 is controlled according to values passed through a DMA control register 404.

The ESFR's include a pixel data buffer underflow register and a header data buffer underflow register 406. The values stored in these two registers by the 8051 210 serve to determine the levels at which the pixel data buffer and the header data buffer respectively are considered to be in an underflow state. The circuit of the invention may likewise be configured to set buffer overflow by data passed through the ESFR's 214. ESFR flag registers 410 indicate when pre-established overflow and underflow thresholds have been traversed.

The ESFR set disclosed in FIG. 1 also includes pixel buffer and header buffer request latency timer registers 414. These registers hold the latency time for fill requests by the pixel and header data buffers respectively. The availability of these latency time measurements is particularly valuable during debugging of the system, and may have continuing value during normal operation.

The ESFR register set also includes a randomizer enable and seed registers 416. These registers receive a seed value from the 8051 that is used to set up the randomizer circuit contained within the serializer module 218, and a flag used to enable and disable the randomizer circuit.

As discussed above, one of the key benefits of CMOS image sensors vis a vis, for example, CCD's is the amenability of CMOS sensors to manufacturing on widely available CMOS fabrication lines. Accordingly, the invention may be manufactured according to conventional CMOS practices, such as are widely known in the art.

Figure 4:
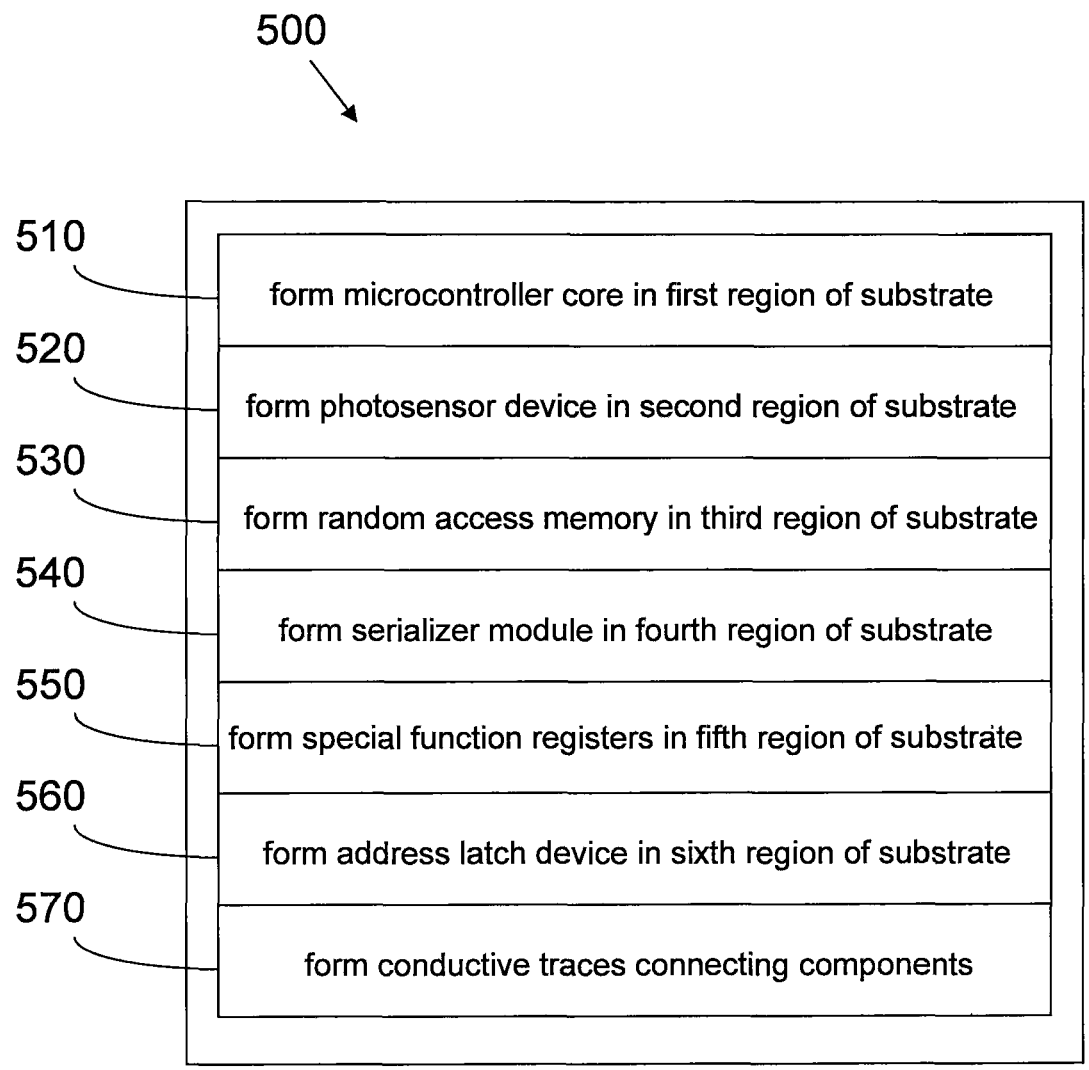
FIG. 4 shows an example fabrication method in block diagram form disclosed herein.

During manufacturing (process 500 of FIG. 4) of an exemplary embodiment, photo lithographic processing is used to form an 8051 microcontroller 210 core in one region of, for example, a silicon substrate 200 (process 510). Also formed in respective second through sixth regions of the substrate are a photosensor device 216, a random access memory device 222, a serializer module 218, a plurality of extended special function registers 214, and an address latch device 224 (processes 520-560). Formed between and over the various regions are conductive traces adapted to operatively couple the various components of the system (process 570). Some of these conductive traces are metallic traces applied in a top-level masking step. The top level masking step is also used, when required by a particular application, to program the ROM embedded within the 8051.

Figure 2:
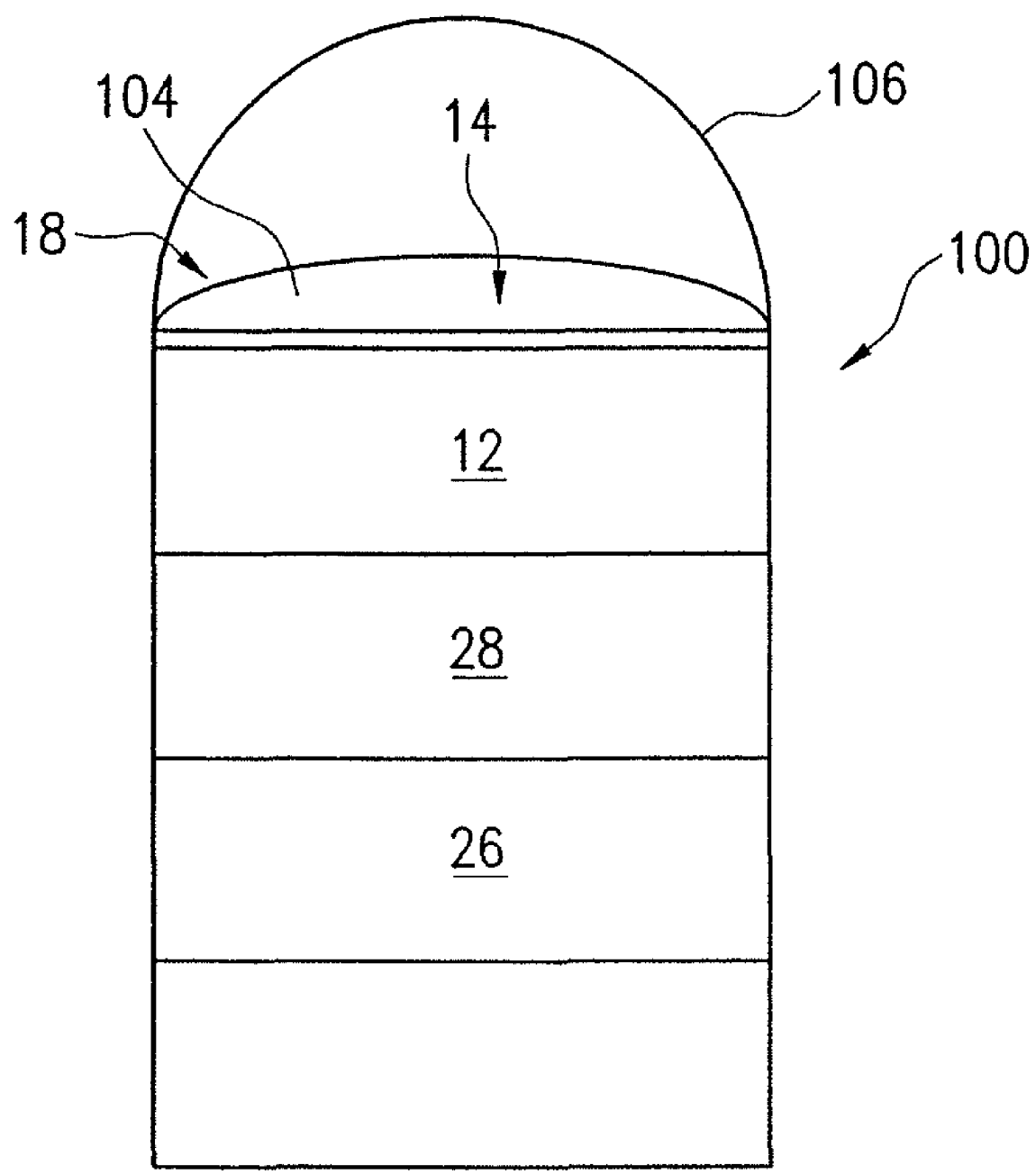
FIG. 2 shows one exemplary embodiment of the invention.

In a preferred embodiment, the device 200 is incorporated into a pill or capsule device 100, as shown in FIG. 2. The pill device 100 can be used, for example, to acquire images of the internal systems (e.g., digestive tract) of an organism. Optionally, the total size of the pill device can be about 12 mm or less by about 26 mm or less, so that it may be swallowed by the organism. In this preferred embodiment, the imager chip 200, RF generator 28, and power source 26 (e.g., nickel-cadmium or silver-oxide battery), and other functional features of the device 10 can be sealed within an inert barrier 106, such as a plastic capsule. The photosensor array 320, as well as the rest of the imager chip 200, can be further protected from the external environment by a glass cover 104. The glass cover can be less than 0.5 mm thick and can have an infrared reject filter on the inner side of the glass. The glass cover 104 can also be used as lens if desired. For example, it may be desirable to utilize a wide-angle lens in the digestive tract of an animal. The pill device 100 can operate on a power source having about $2.8 \text{ v} \times 0.3 \times 10^{-3}$ W power.

In this embodiment, as with other embodiments, information can be downloaded into the pill 100 in accordance with the invention to control operations in acquiring desired images during use. For instance, the image capture frequency and strobing sequence of the LED(s) 18 can be programmed. The synching of the image reading by the photosensor array 320 to the LED 18 can be programmed. Image fill frame formatting can be programmed. Further, lossless compression, scrambling, cavity lighting requirements and the driving transmitter, among other things, can be programmed to function as desired. Additional functions of the imager can be controlled by the downloaded information, as will become apparent to those of skill in the art.

Figure 3:
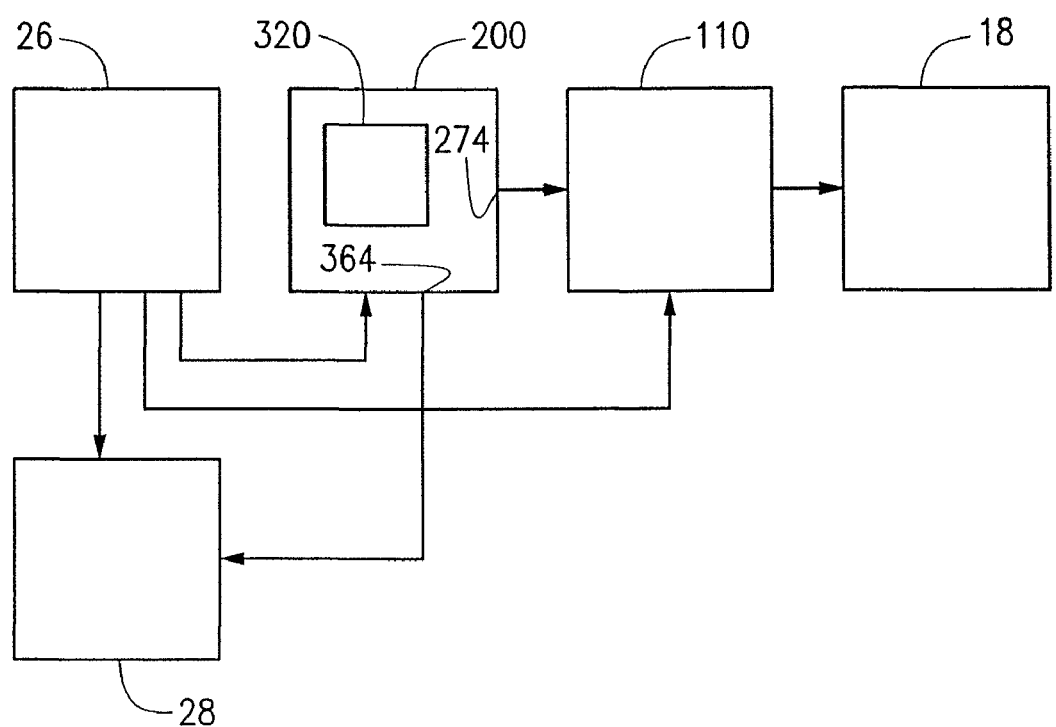
FIG. 3 shows one aspect of the FIG. 2 embodiment in block diagram form.

FIG. 3 shows an aspect of the FIG. 2 embodiment in block diagram form. The power supply 26 supplies power to the imager chip 200, to an LED driver circuit 110 and to the RF transmitter 28. The imager chip 200 controls operation of the LED driver circuit 110 through output 274 and sends data to the RF transmitter through output 364.

The integration of the sensor and controller and ancillary circuits on a common substrate opens the way to a wide variety of applications. For example, an image capture device formed as a pull or ingestible capsule can be used to photograph the interior of a digestive tract, while reducing the overall size of the imaging system and extending the battery life. The present invention allows the preparation of an ingestible capsule with expanded capabilities and a diameter on the order of 12 mm. In particular, because image data is available to the 8051 core by way of the image data capture register, the 8051 can act to control the image acquisition process in real time or near real time. The present invention can also be used to correct image acquisition parameters such as exposure, offset, and gain from line to line of an image so that image data acquired at the beginning of an image frame may be used to improve the quality of the balance of the same image. This feature is of particular importance in an application such as the ingestible capsule system. In an ingestible capsule application, peristaltic transport of the pill prevents retaking of missed images. Moreover, ingestible capsule images are typically not viewed in real time, but are reviewed in batch mode after completion of a GI tract transit. Finally, power storage limitations are a significant constraint on current embodiments of the ingestible capsule, and capturing additional images expends precious power. For all of these reasons, it is important that every image captured by the ingestible capsule system be of the best possible quality. The ability to correct image quality continuously throughout image acquisition is therefore of immediate practical significance.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A method of forming an integrated CMOS imaging device comprising the steps of:
    fabricating controller circuitry in a first region of a die;
    fabricating an array of random access memory cells in a second region of said die;
    fabricating an array of CMOS photosensors in a third region of said die;
    fabricating a plurality of special function registers in a fourth region of said die; and
    fabricating a serializer output circuit adapted to be disposed in a fifth region of said die, said serializer output circuit comprising:
    a randomizer;
    a serializer control circuit; and
    a dynamic arbiter circuit having first and second inputs and switching between said first and second inputs, said switching programmably defined by said controller circuitry,
    wherein said controller circuitry is adapted to output control data through one or more of said plurality of special function registers to the serializer control circuit which executes said switching.

2. The method of claim 1, wherein said method is performed using photolithographic processing.

3. The method of claim 1 further comprising sealing the imaging device in a capsule.

4. The method of claim 1 wherein at least one of said plurality of special function registers is coupled to the controller circuitry and the photosensors.

5. The method of claim 1, wherein the step of fabricating the plurality of special function registers comprises fabricating at least a sensor control register.

6. The method of claim 1, wherein the step of fabricating the plurality of special function registers comprises fabricating at least a sensor capture register.

7. A method of fabricating a controllable optical sensor array, said method comprising:
    forming a microcontroller circuit in a first region of a substrate;
    forming a photosensor array device in a second region of said substrate;
    forming a memory device in a third region of said substrate;
    forming a serializer circuit in a fourth region of said substrate, said serializer circuit comprising:
    a randomizer;
    a serializer control circuit and
    a dynamic arbiter circuit having first and second inputs and switching between said first and second inputs, said switching programmably defined by said microcontroller circuit;
    forming a plurality of special function registers in a fifth region of said substrate, wherein said microcontroller circuit is adapted to output control data through one or more of said plurality of special function registers to said serializer control circuit which executes said switching;
    coupling said microcontroller to said plurality of special function registers;
    coupling said microcontroller to said memory device;
    coupling said microcontroller to said serializer circuit;
    coupling at least one of said plurality of registers to said photosensor array device;
    coupling at least one of said plurality of registers to said serializer; and
    coupling said photosensor array device to said serializer.

8. The method of claim 7 further comprising sealing the controllable optical sensor array in a swallowable capsule.

9. A method of forming an imaging device, said method comprising:
    forming a microcontroller circuit on an integrated circuit die;
    forming a sensor array on said integrated circuit die;
    forming an image register on said integrated circuit die;
    forming a plurality of special function registers on said integrated circuit die;
    forming a dynamic arbiter circuit having first and second inputs and switching between said first and second inputs, said switching programmably defined by said microcontroller circuit, on said integrated circuit die, wherein said microcontroller circuit is adapted to output control data through one or more of said plurality of special function registers to define said switching;
    forming a randomizer on said integrated circuit die, wherein said randomizer comprises a shift register with feedback to produce a pseudorandom output; and
    electrically coupling said image register to said sensor array, said dynamic arbiter circuit, said randomizer and to said microcontroller circuit.

10. The method of claim 9 further comprising sealing the imaging device in a swallowable capsule.

11. The method of claim 9, wherein the step of fabricating the image register comprises fabricating a plurality of special function registers.

12. The method of claim 11, wherein the step of fabricating the plurality of special function registers comprises fabricating at least a sensor control register.

13. The method of claim 11, wherein the step of fabricating the plurality of special function registers comprises fabricating at least a sensor capture register.

14. The method of claim 11, wherein the step of fabricating the plurality of special function registers comprises fabricating at least one of a sensor control register, sensor capture register, DMA control register, pixel data buffer register, header data buffer register, pixel data buffer underflow register, header data buffer underflow register, pixel data buffer overflow register, header data buffer overflow register, pixel data buffer request latency timer register, header buffer request latency timer register, and a randomizer enable register and seed register.

15. A method of fabricating an image sensor, said method comprising:
    fabricating an image sensor array in a first region of an integrated circuit die;
    fabricating a microcontroller circuit in a second region of said integrated circuit die;
    fabricating a special function register in a third region of said semiconductor die;
    fabricating a pixel data buffer;

fabricating a header data buffer;
fabricating a randomizer;
fabricating a dynamic arbiter having first and second inputs and switching between said first and second inputs, said switching programmably defined by said microcontroller circuit, wherein said microcontroller circuit is adapted to output control data through said special function register to define said switching; and
fabricating a first conductive connection between said microcontroller circuit and said special function register, a second conductive connection between said special function register and said image sensor array, fabricating a third conductive connection between said pixel data buffer and said image sensor array, fabricating a fourth and fifth conductive connections between said dynamic arbiter and said header data buffer and pixel data buffer, and fabricating a sixth conductive connection between said dynamic arbiter and said randomizer.

16. The method of claim 15, wherein the step of fabricating the special function register comprises fabricating a plurality of special function registers.

17. The method of claim 15, wherein the step of fabricating the special function register comprises fabricating said special function register selected from the group consisting of a sensor control register, sensor capture register, DMA control register, pixel data buffer underflow register, header data buffer underflow register, pixel data buffer overflow register, header data buffer overflow register, pixel data buffer request latency timer register, header buffer request latency timer register, a randomizer enable register and a seed register.

18. The method of claim 15 further comprising sealing the image sensor in a swallowable capsule.

* * * * *

UNITED STATES PATENT AND TRADEMARK OFFICE
CERTIFICATE OF CORRECTION

| | | |
|---|---|---|
| PATENT NO. | : 8,149,307 B2 | |
| APPLICATION NO. | : 12/611349 | |
| DATED | : April 3, 2012 | |
| INVENTOR(S) | : Atif Sarwari | |

It is certified that error appears in the above-identified patent and that said Letters Patent is hereby corrected as shown below:

On the Title page, in field (56), under "Other Publications", in column 2, line 2, delete "Pretice" and insert -- Prentice --, therefor.

In column 11, line 63, in Claim 7, delete "circuit" and insert -- circuit; --, therefor.

Signed and Sealed this
Twenty-ninth Day of May, 2012

David J. Kappos
*Director of the United States Patent and Trademark Office*